(12) United States Patent
Hettinger

(10) Patent No.: US 6,267,191 B1
(45) Date of Patent: Jul. 31, 2001

(54) SELF ADVANCING MINING SLED

(75) Inventor: David Allyn Hettinger, New Bern, NC (US)

(73) Assignee: Randall D. Peterson, Sandy, UT (US)

( * ) Notice: Subject to any disclaimer, the term of this patent is extended or adjusted under 35 U.S.C. 154(b) by 0 days.

(21) Appl. No.: 09/351,482

(22) Filed: Jul. 13, 1999

(51) Int. Cl.[7] .................................................. B62M 27/02
(52) U.S. Cl. ............................................. 180/187; 180/7.1
(58) Field of Search ............................... 180/187, 7.1, 8.6

(56) References Cited

U.S. PATENT DOCUMENTS

| 3,365,012 | * | 1/1968 | Grossfield | 180/187 |
| 3,866,835 | * | 2/1975 | Dowd | 180/187 |
| 4,286,681 | * | 9/1981 | Kirchhoff | 180/8 R |
| 5,161,631 | * | 11/1992 | Urakami | 180/164 |

FOREIGN PATENT DOCUMENTS

| 1081320 | * | 5/1960 | (DE) | 180/8.6 |
| 94/25329 | * | 11/1994 | (WO) | 180/8.6 |

* cited by examiner

*Primary Examiner*—J. J. Swann
*Assistant Examiner*—Michael Cuff

(57) ABSTRACT

Disclosed is a self propelled device and method for transporting and positioning bulk solids handling equipment across working surfaces of limited bearing strength. Multiple advancing sleds (10) and equipment base sleds (12) are connected by interlocking angles (21) and thrust cylinders (15). Alternate extension and retraction of thrust cylinders (15) cause alternate sleds to push forward while other sleds serve as anchors. Methods to use the self advancing mining sled in hydraulic mining and dry mining applications are disclosed.

5 Claims, 16 Drawing Sheets

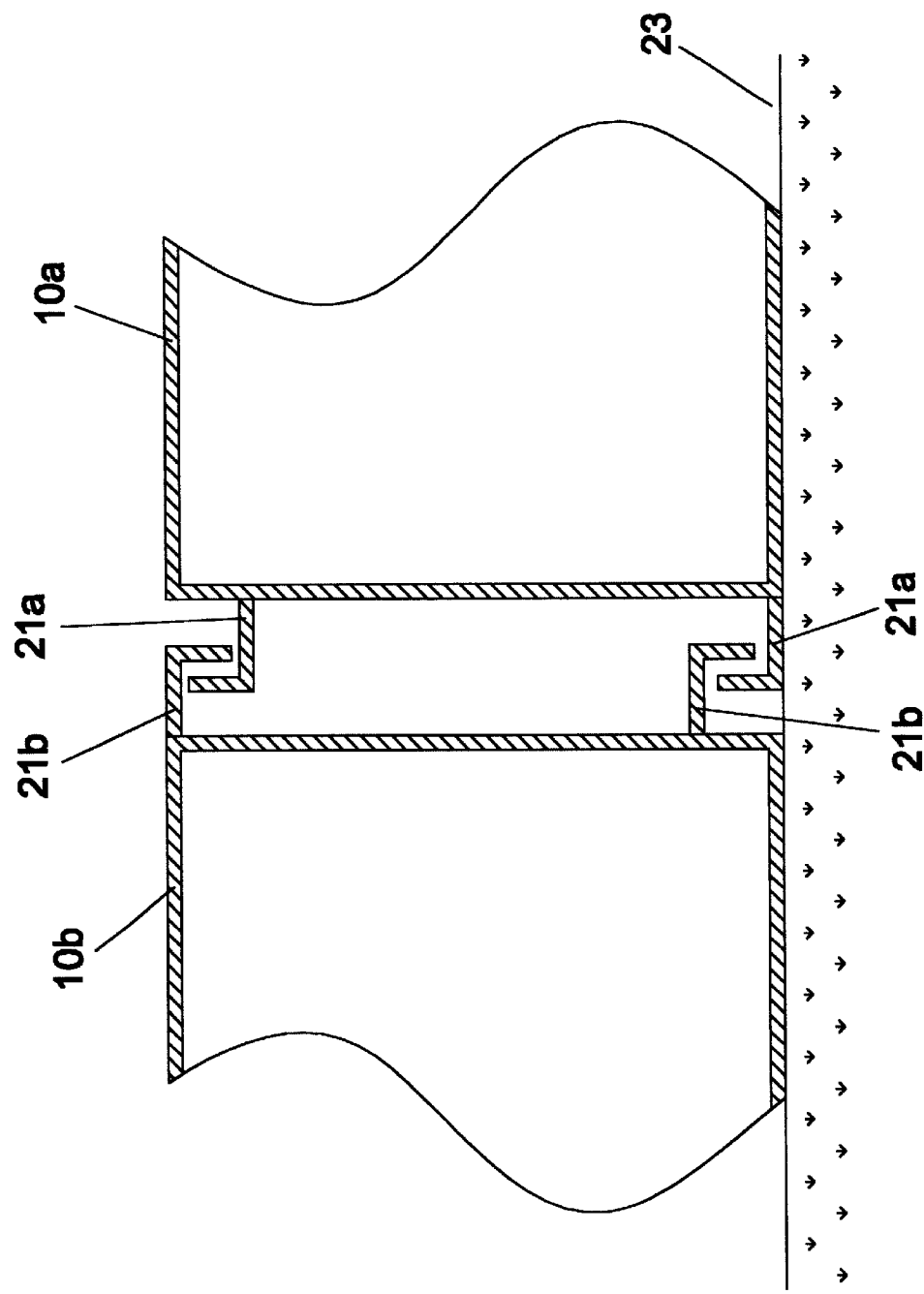

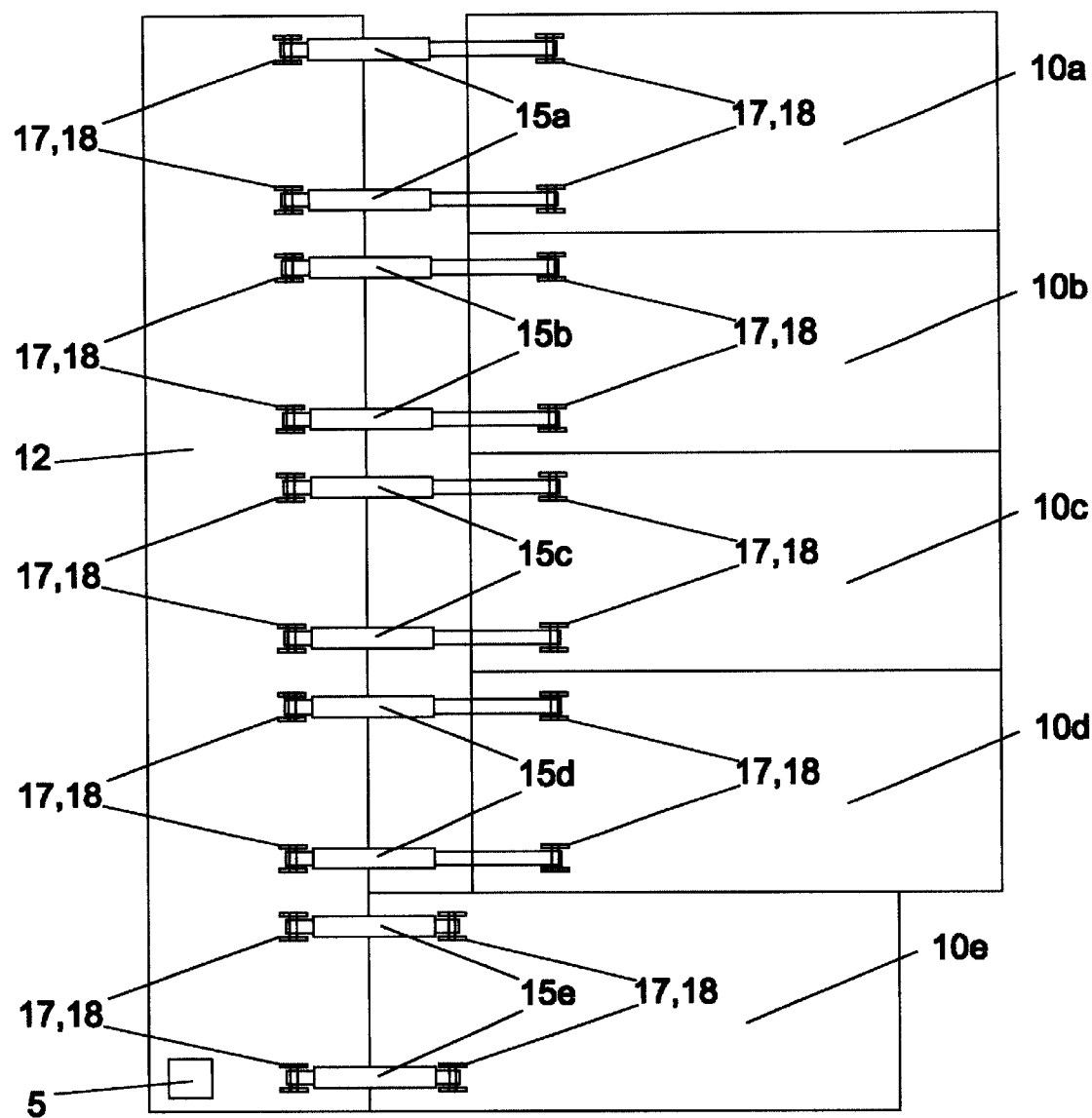
Fgure 5e

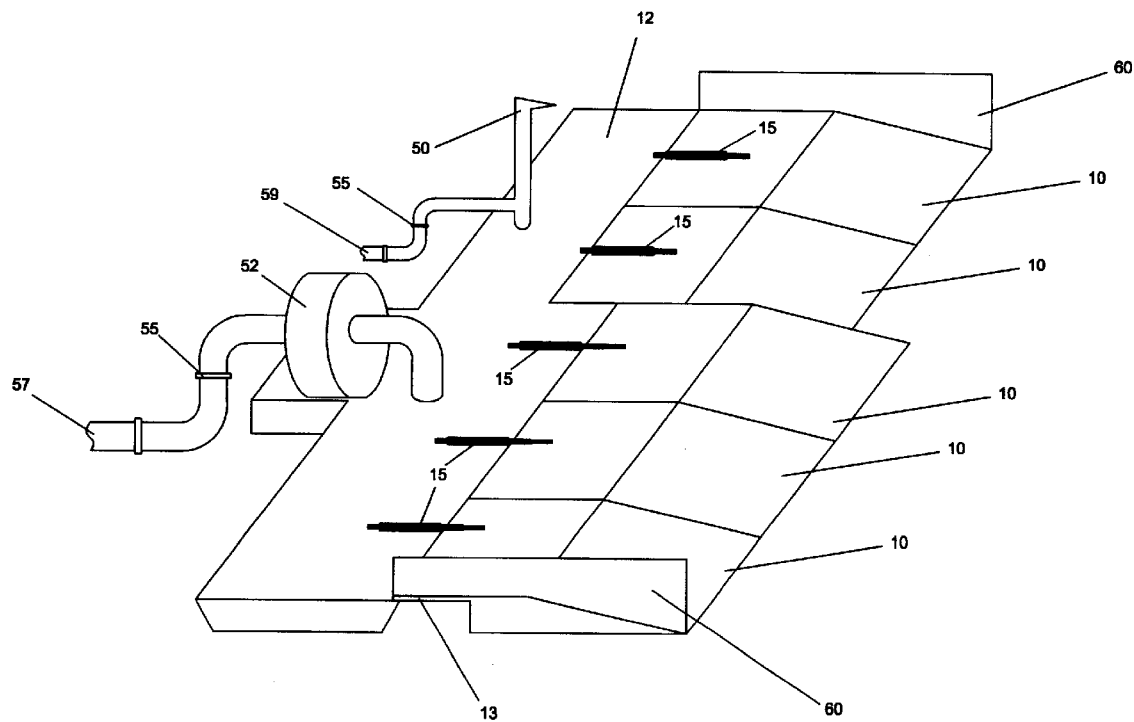

SELF ADVANCING MINING SLED

DRY MINING APPLICATION

SELF ADVANCING MINING SLED

BACKGROUND

1. Field of the Invention

This invention relates in general to the field of mining and, in particular, to a novel method to relocate and position bulk solids handling machinery used in surface mining activities.

2. Description of Prior Art

Bulk solids handling machinery such as slurry sluicing systems, conveyor belt systems, drag conveyor systems, crushers, grinders, screens, centrifuges, cyclones and other equipment and systems, are used to transport or treat material such as ore, farm products, wood chips, and other bulk solid materials, These systems may be used to move these bulk materials from stockpiles, settling ponds, spill collection areas, mining or agricultural operations and other situations.

In many cases, operation of these systems requires the systems to be periodically relocated. Material close to and within reach of the system is gathered and transported by the system. Continued operation causes the distance between the bulk solids and the handling system to increase until continued operation is either impossible or unacceptably inefficient. At that time, operation of the handling system is suspended and the system is relocated closer to the bulk solids. Multiple repetitions of this cycle advance the system through the material, Relocation of the bulk solids handling machinery is frequently accomplished by mounting the equipment on "crawlers" comprised of an endless chain of bearing pads that are driven by motors to loop around a pair of sprockets. A reader familiar in the art of bulk solids handling machinery will recognize this system as that of tracked equipment such as bulldozers and backhoes.

While the crawler system described above provides great operational flexibility, it also suffers from two disadvantages. Firstly, the crawler system is a complex machinery unit with multiple moving parts that are expensive to manufacture and to maintain. Secondly, the crawler system has limited bearing surface over which to distribute the weight of the crawler and bulk handling equipment. This means that crawler systems cannot economically operate on surfaces with low bearing strength such as that found in wet or clayey soils. While the width and length of the crawlers may be increased to provide greater bearing surface, the cost of manufacture and operation increases accordingly. Thus, it is seen that crawler systems are limited to working on surfaces with good bearing strength and where the need for a highly mobile operation overcomes the disadvantage of high costs.

Relocation of the bulk solids handling machinery is frequently accomplished by mounting the equipment on wheels. This method is favored in situations where the equipment is frequently relocated over long distances, as is the case with haulage trucks or portable crushers and screens. Wheel mounted systems provide very small bearing surface over which to distribute the equipment weight and are therefore limited to working on surfaces with very good bearing strength.

Relocation of the bulk solids handling machinery is frequently accomplished by mounting the equipment on skids. These units may be economically manufactured and maintained to provide bearing surfaces large enough to support very large equipment units on very soft surfaces with very low bearing strength. However, these units have no self-propulsion mechanism and must be drug or pushed into position by wheeled or tracked equipment described previously. Thus, this method of equipment relocation is limited to situations where relocation is infrequent.

A specialized self propelled equipment skid is taught by the prior art. These units are comprised of two piece skids connected by hydraulic cylinders that alternately extend to thrust the leading skid ahead and retract to pull the trailing skid back into position behind the leading skid. These units can operate only in confined spaces, such as trenches or in underground mines. Hydraulic cylinders must be extended between the side walls of the trench or between the mine roof and mine floor to anchor the trailing skid while the leading skid is advanced and similarly to anchor the leading skid while the trailing skid is advanced.

None of the existing means for relocating bulk solids handling equipment address the situation where the equipment is required to frequently or continuously travel across surfaces with very low bearing support unless the equipment is operating within a confined space such as a trench or underground mine.

OBJECTS AND ADVANTAGES

Accordingly, the present invention has several objects and advantages:

a) to provide a system whereby bulk solids handling machinery may be relocated across surfaces with very low bearing strength;

b) to provide an equipment relocation system that is more economical than existing systems;

c) to provide an equipment relocation system with a means of self-propulsion that does not require operation within a confined space; and d) to provide methods to use an equipment relocation system in new mining methods.

Further objects and advantages of the present invention will become apparent from a consideration of the ensuing description and drawings.

DRAWING FIGURES

Drawings provided to describe this invention include the following:

FIG. 4 depicts Section a—a from FIG. 2 to show a detail view of a method to interlock the Advancing Sleds.

FIGS. 5a to 5f are plan views showing the sequential steps to complete advancement of a Self Advancing Mining Sled with five Advancing Sleds and one Equipment Base Sled.

FIG. 10 shows an isometric view of a Self Advancing Mining Sled depicted as a means to relocate hydraulic mining and slurry pumping equipment.

Figure 1:
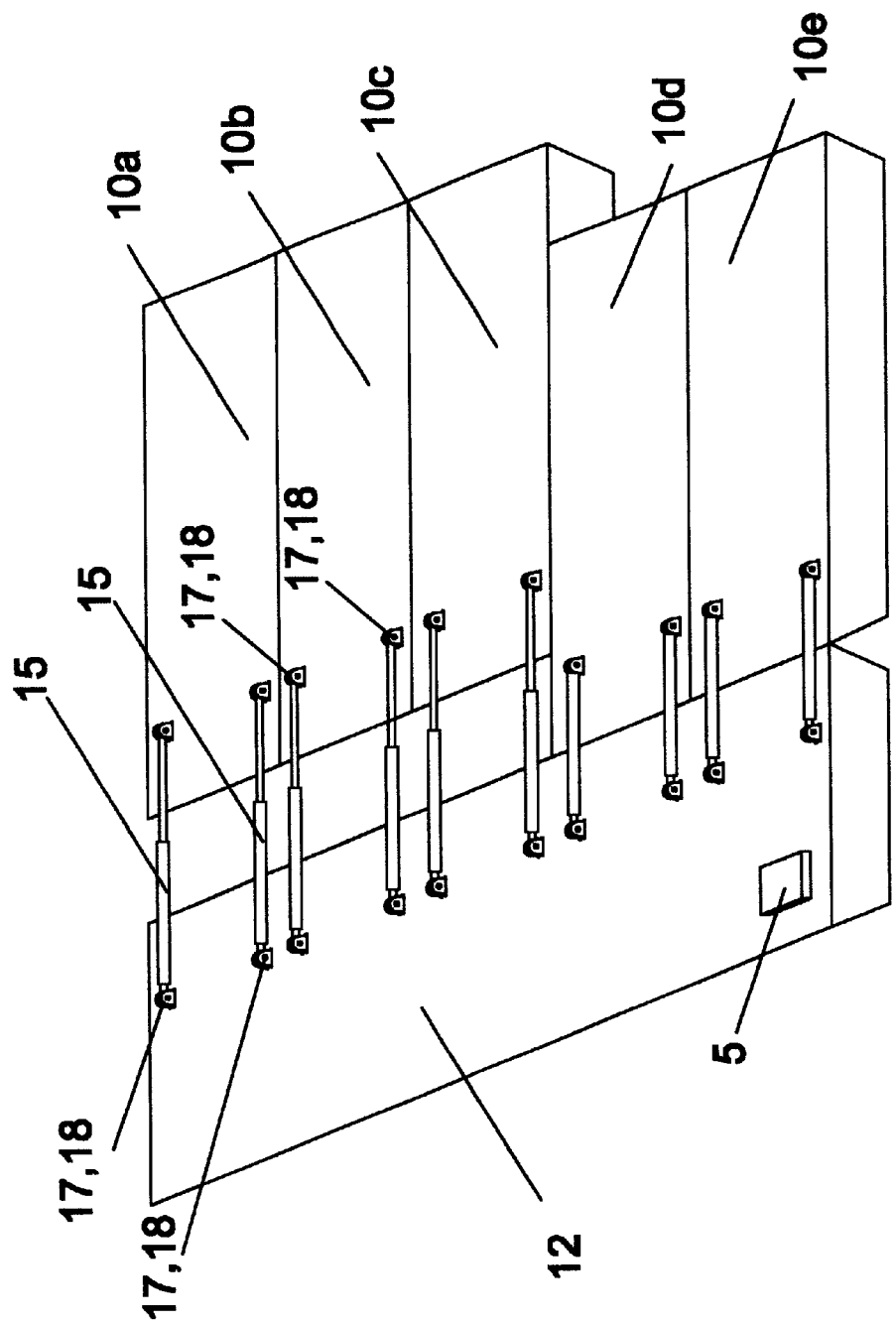
FIG. 1 is an isometric view of the Self Advancing Mining Sled with five Advancing Sleds and one Equipment Base Sled arranged in a line and advancing perpendicularly to the axis of the line.

| Reference Numerals in Drawings | |
|---|---|
| 5. | Control Means |
| 10a.–10e. | Advancing Sled |
| 12. | Equipment Base Sled |
| 13. | Overlapping Deck |
| 15a.–15e. | Thrust Cylinder |
| 17. | Pin Connection |
| 18. | Attachment Bracket |
| 21. | Interlocking Angles |
| 23. | Working Area Floor |
| 27. | Saw Teeth |
| 28. | Tooth Pin |
| 33. | Anchor Pin |
| 37. | Elevation Control Wedge |
| 38. | Wedge Pin Connection |
| 39. | Wedge Actuator |
| 50. | Water Nozzle |
| 52. | Slurry Pump |
| 55. | Swivel Joint |
| 57. | Slurry Discharge Pipe |
| 59. | Water Intake Pipe |
| 60. | Wing Walls |
| 65. | Excavator |
| 67. | Conveyor |
| 71. | Vertical Level Adjusters |

Summary

In accordance with the present invention, theSelf Advancing Mining Sled is comprised of multiple Advancing Sleds 10 and multiple Thrust Cylinders 15. The equipment assemblage advances by sequentially extending Thrust Cylinders 15 to push one Advancing Sled 10 ahead a distance equal to Step Length 13 while the remaining Advancing Sleds 10 serve as anchors. Repeating the extension of Thrust Cylinders 15 for each Advancing Sled 10 causes the entire Self Advancing Mining Sled to advance a distance equal to the stroke length of Thrust Cylinders 15.

DESCRIPTION—PREFERRED EMBODIMENTS FIGS. 1 THROUGH 4

Figure 2:
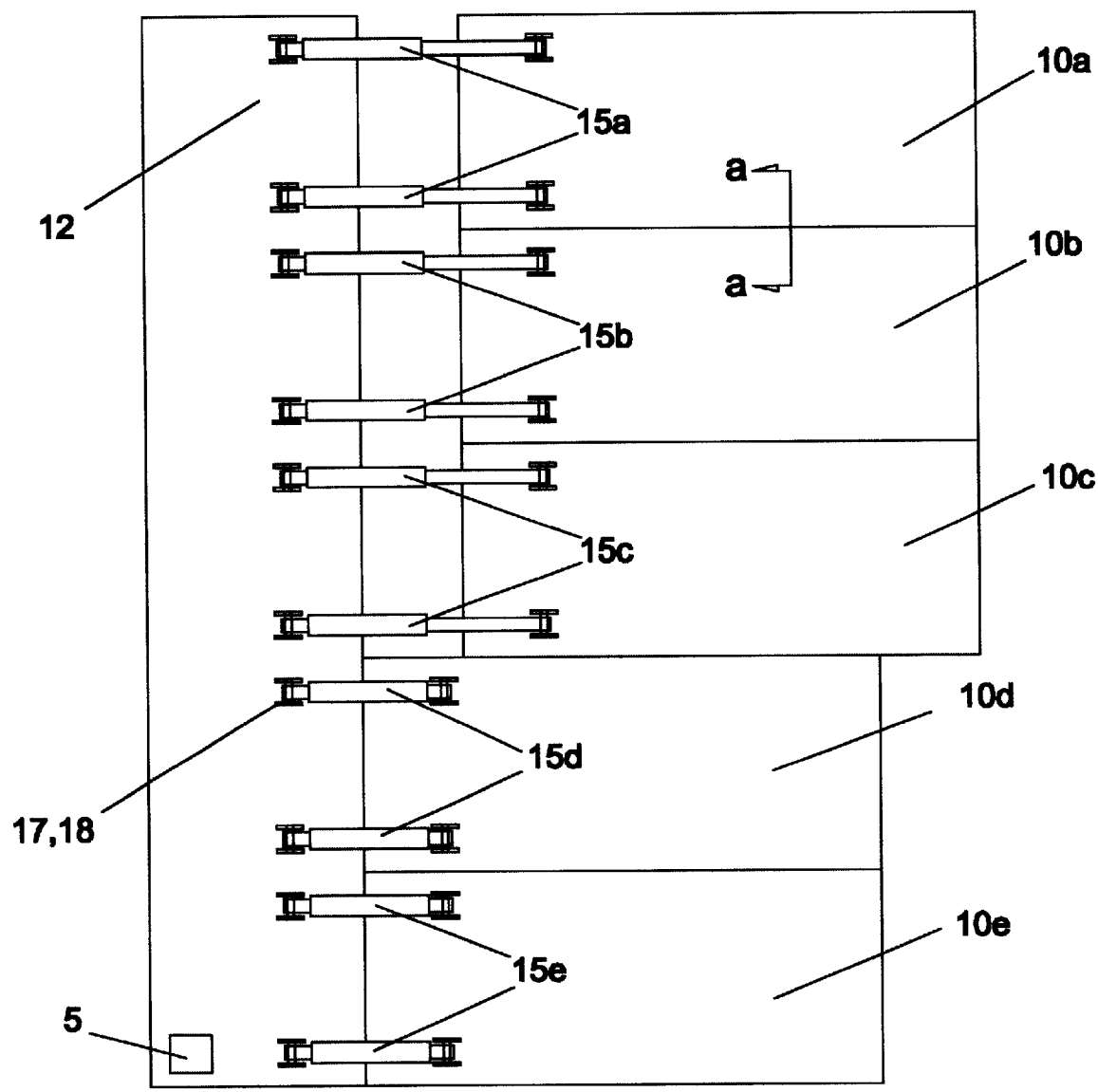
FIG. 2 is a plan view of the Self Advancing Mining with five Advancing Sleds and one Equipment Base Sled arranged in a line and advancing perpendicularly to the axis of the line.

A typical embodiment of the Self Advancing Mining Sled is shown in isometric view in FIG. 1, in plan view in FIG. 2, and in side view in FIG. 3. The Self Advancing Mining Sled as shown is comprised of five Advancing Sleds 10 and one Equipment Base Sled 12. Any combination of Advancing Sleds 10 and Equipment Base Sleds 12 may be used, in accordance with principles described below.

FIGS. 1, 2, and 3 indicate Advancing Sleds 10 and Equipment Base Sled 12 as rectangular box-like structures with angled leading and trailing edges. Any other shape can be used with the provision of sufficient bearing surface to support the weight of the Self Advancing Mining Sled and equipment transported there on. These structures may be constructed of steel, aluminum, wood, plastic, or any other fabrication material. Advancing Sleds 10 and Equipment Base Sled 12 will be structurally designed according to known design art and the requirement of the equipment to be carried on the Self Advancing Mining Sled and the conditions in which the Self Advancing Mining Sled will operate.

FIGS. 1, 2, and 3 indicate Control Means 5 as a computer based controller. Such a computer may be programmed to advance the Advancing Sleds 10 and Equipment Base Sled 12 on predetermined intervals that fit the needs of the operation. Alternately, Control Means 5 may be hand operated switches, valves, levers, push buttons or other devices controlled my attendant operators.

Figure 3A:
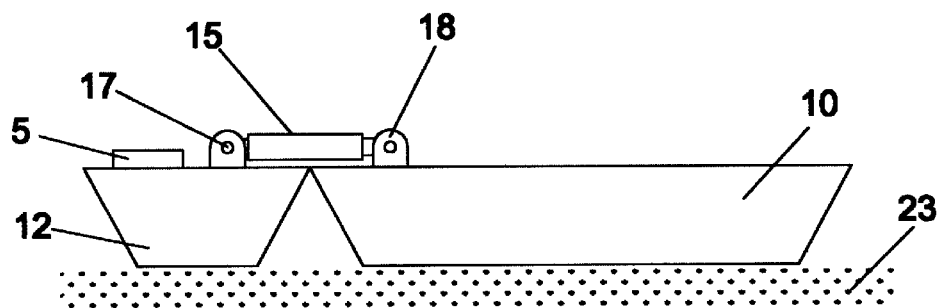
FIGS. 3a and 3b are cross sectional views of the Self Advancing Mining Sled showing relative positions of the Advancing Sleds and the Equipment Base Sled when the Thrust Cylinder is retracted and when the Thrust Cylinder is extended.
Figure 3B:
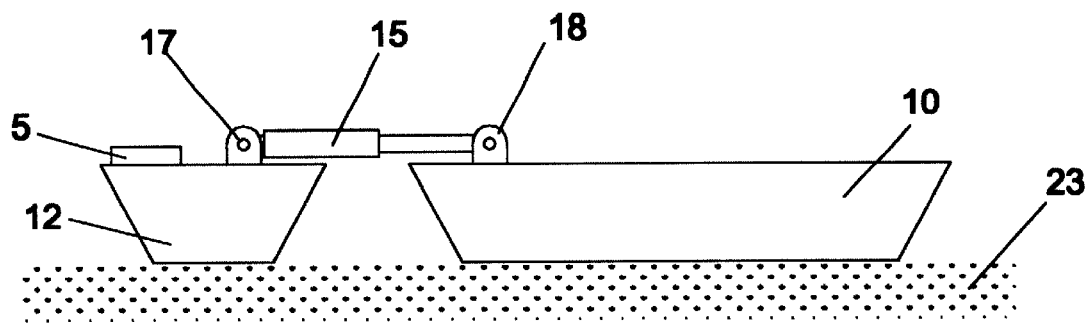

FIG. 3a shows the relative positions of Advancing Sled 10 and Equipment Base Sled 12 when Thrust Cylinders 15 are in the retracted position. FIG. 3b shows the relative positions of Advancing Sleds 10 and Equipment Base Sled 12 when Thrust Cylinders 15 are in the extended position, FIGS. 1 and 2 show Advancing Sleds 10a through 10c with Thrust Cylinders 15 in the extended position and show Advancing Sleds 10d and 10e with Thrust Cylinders 15 in the retracted position.

FIGS. 1, 2 and 3 indicate that Thrust Cylinders 15 are attached to Advancing Sleds 10 and Equipment Base Sled 12 at Pin Connections 17 and Attachment Brackets 18. Thrust Cylinders 15 may be powered by pressurized hydraulic fluid, water, oil-water emulsion, air, gas or other fluids. The source of this pressurized fluid will be a typical pump device installed on and transported by Equipment Base Sled 12.

FIG. 4 provides a detail view of the Section Line a-a indicated on FIG. 2. This view shows a method of interlocking adjacent Advancing Sleds 10. Interlocking Angles 21a and 21b are fastened by bolts or welds to the sides of Advancing Sleds 10a and 10b so that any lateral motion of Advancing Sleds 10 will cause the faces of Interlocking Angles 21a to butt against the faces of Interlocking Angles 21b. Many variations of this basic interlocking method may be devised.

Figure 5A:
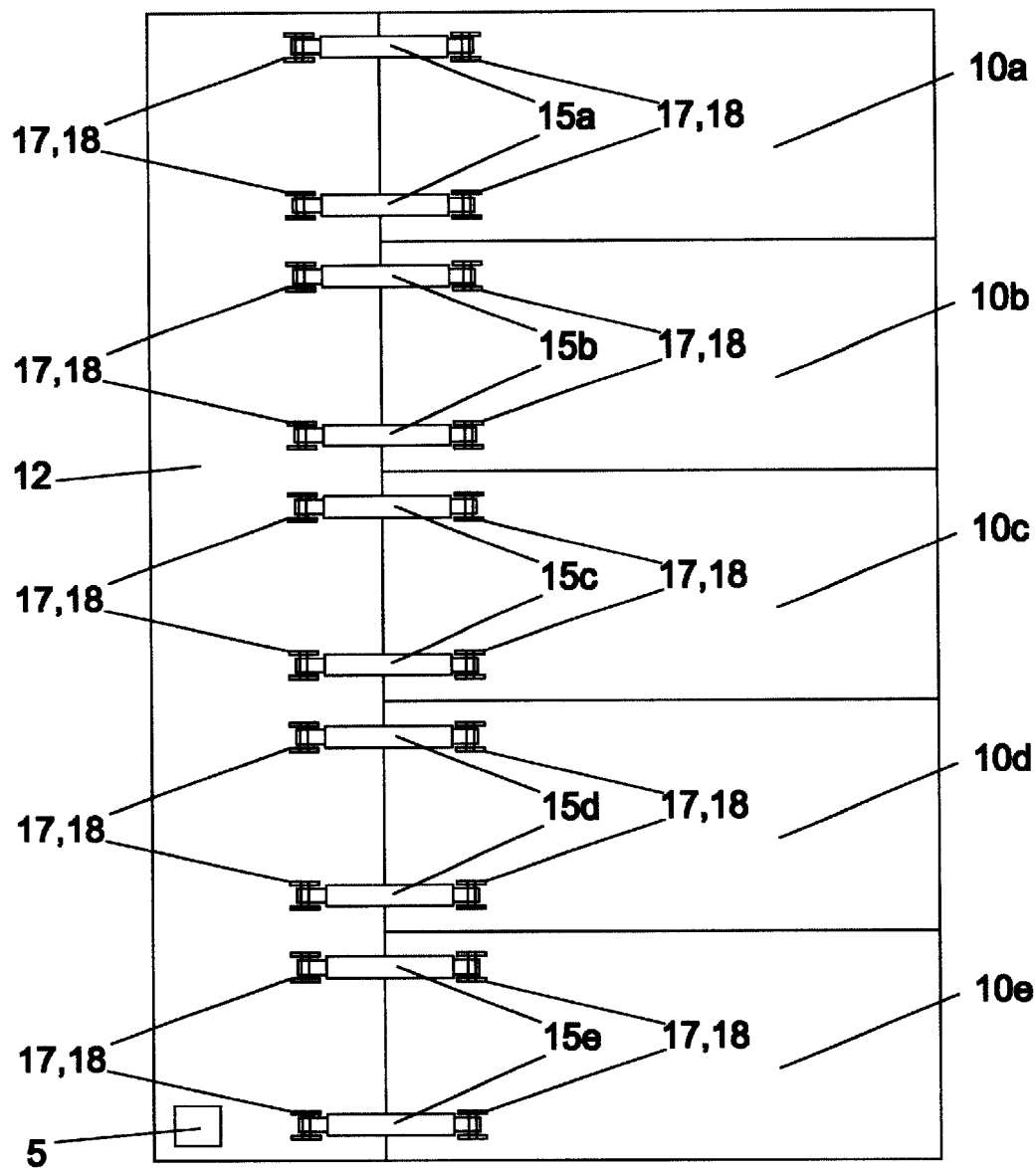
Figure 5B:
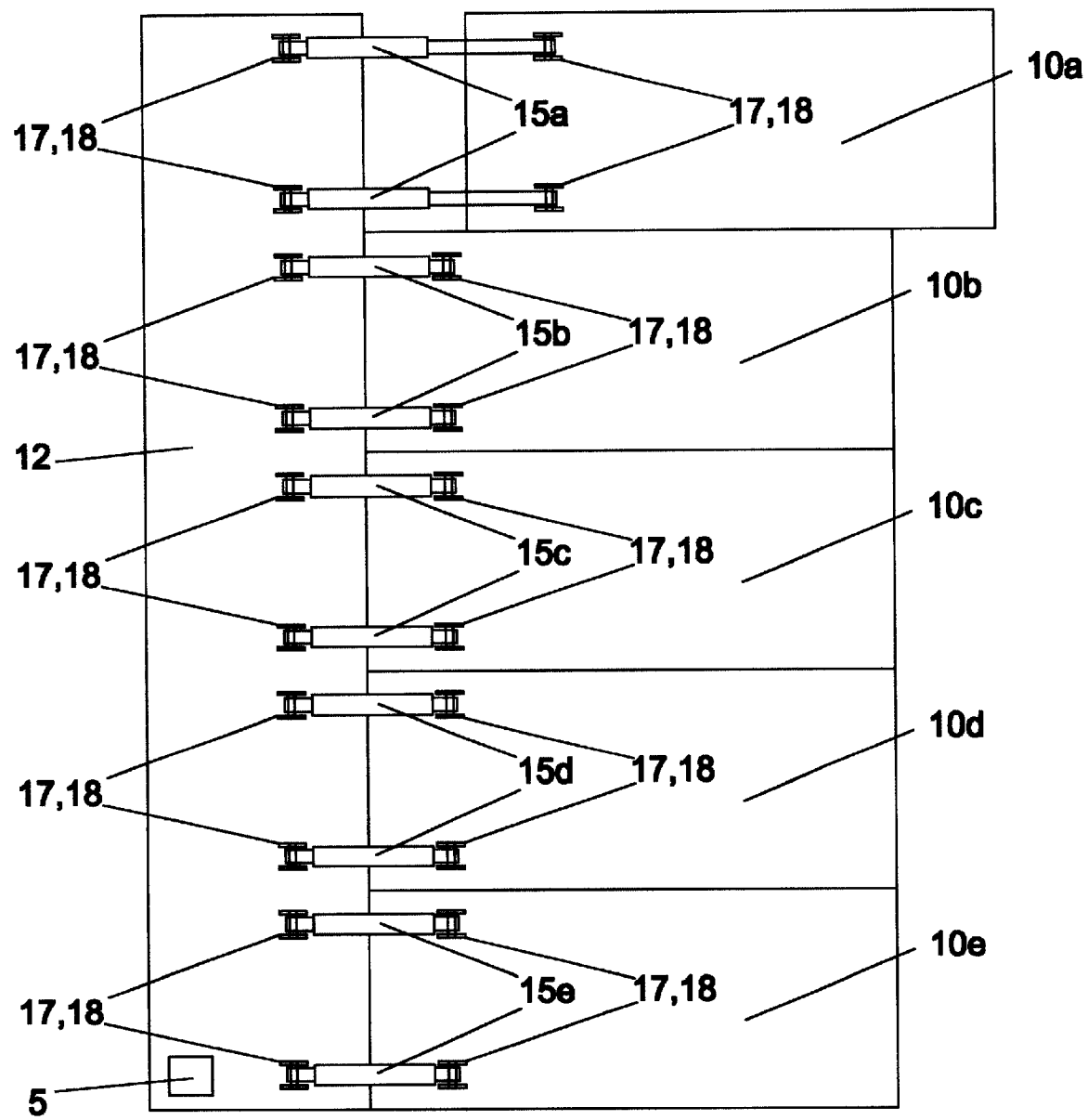
Figure 5C:
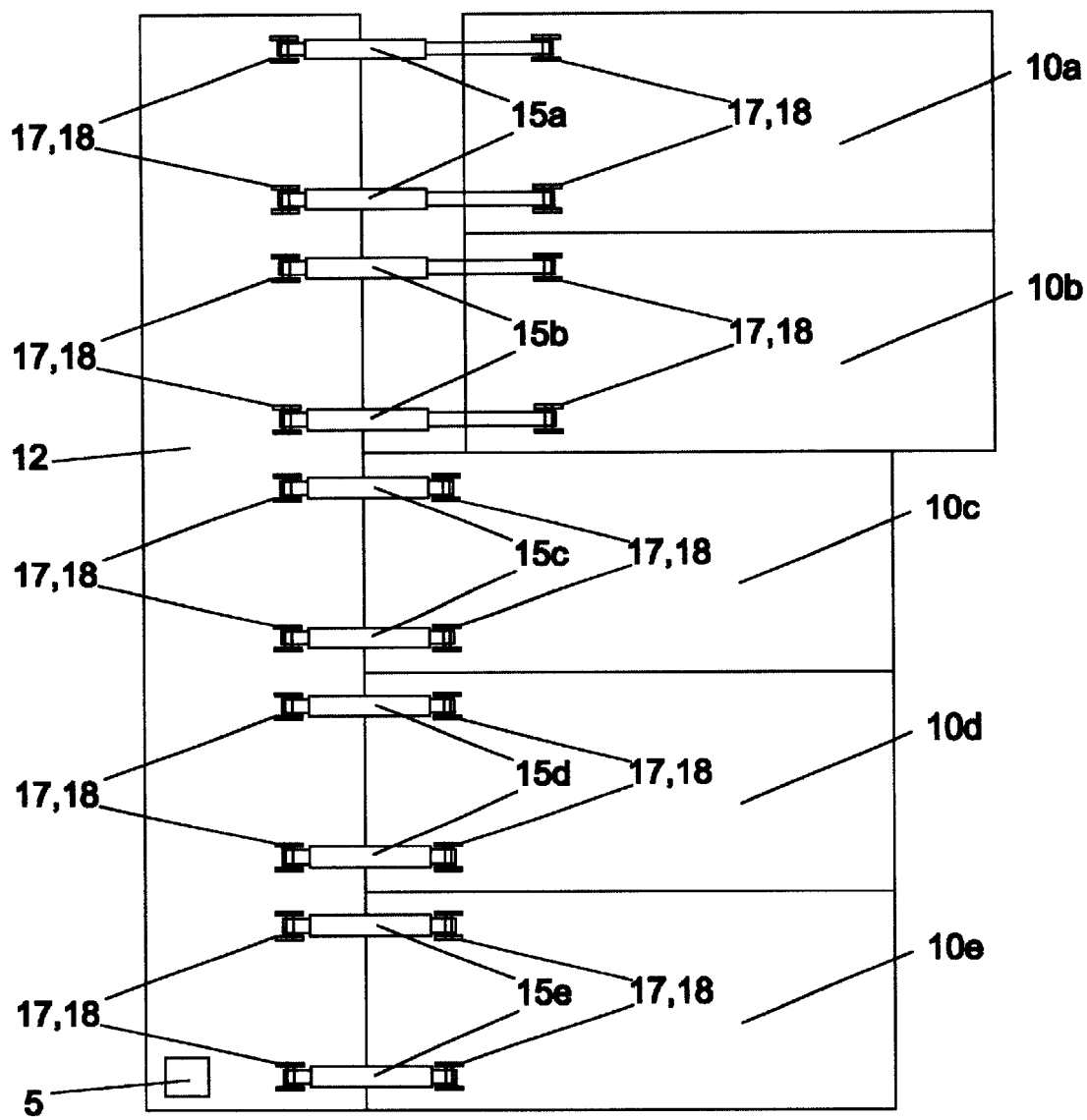
Figure 5D:
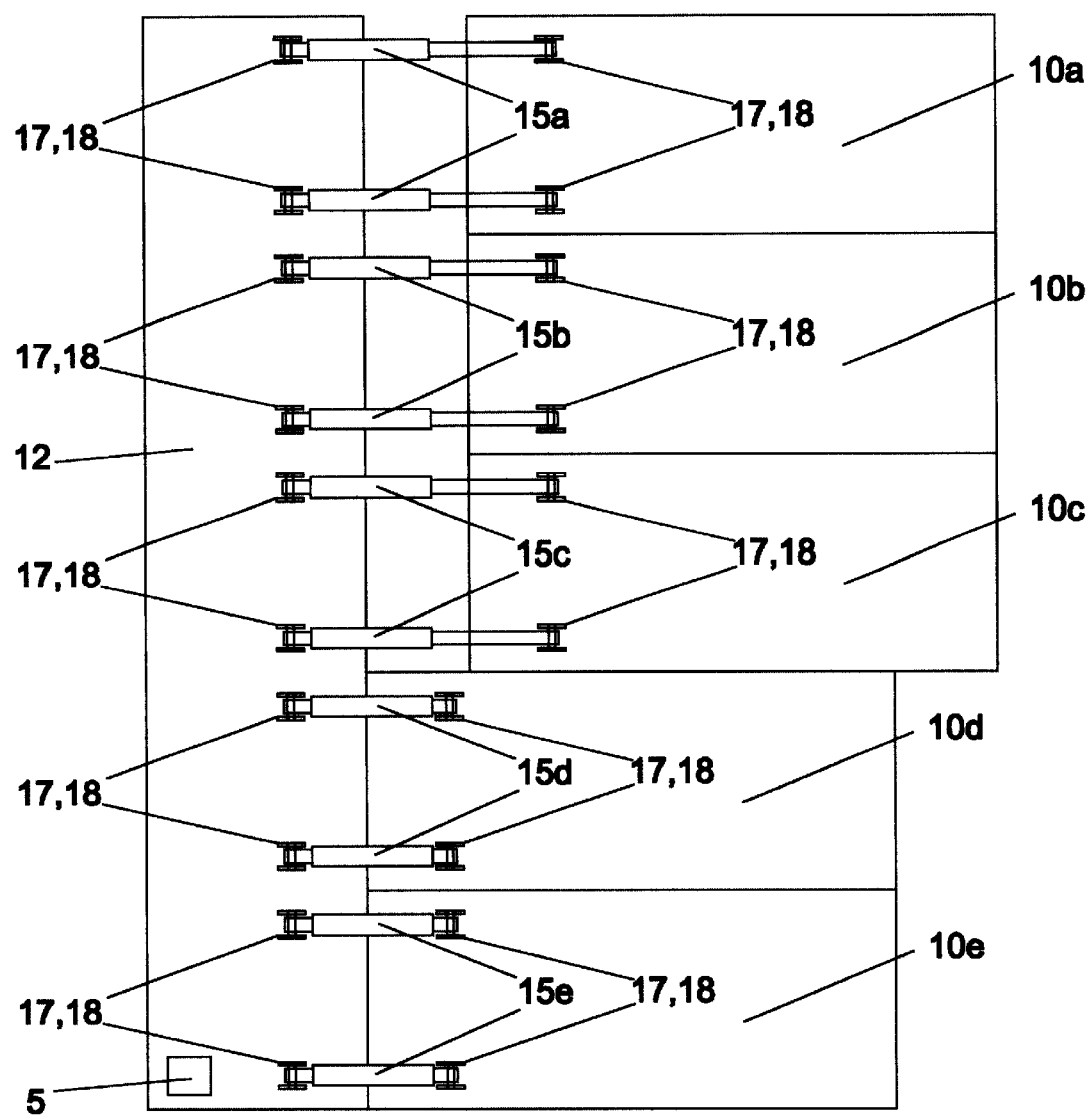
Figure 5F:
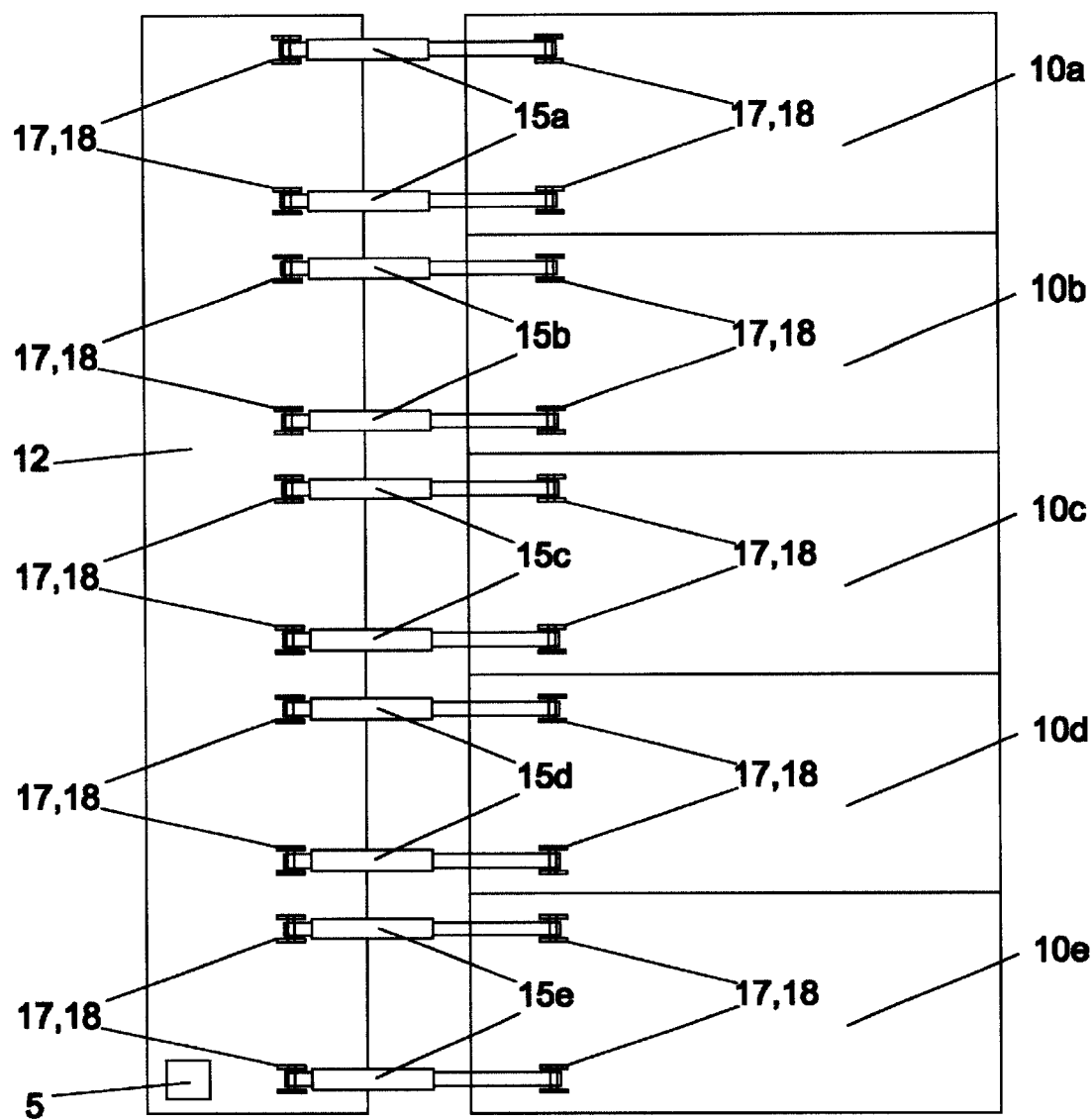

FIGS. 5a through 5f depict the sequential positioning of Advancing Sleds 10a through 10e and Equipment Base Sled 12 as the Self Advancing Mining Sled is advanced. FIG. 5a shows the Self Advancing Mining Sled with Advancing Sleds 10a through 10e in the retracted position Subsequent FIGS. 5b through 5f depict the Self Advancing Mining Sled after individual Advancing Sleds 10a through 10e have been thrust ahead. FIG. 5f shows the position of Advancing Sleds 10a through 10e prior to retracting Thrust Cylinders 15 to the retracted position and drawing Equipment Base Sled 12 into the arrangement depicted in FIG. 5a.

The Self Advancing Mining Sled may be operated on any type of Working Area Floor 23 material such as concrete, asphalt, rock, soft dirt, or mud.

OPERATION—PREFERRED EMBODIMENT: FIGS. 1 THROUGH 5

The Self Advancing Mining Sled relies on friction between Equipment Base Sled 12 and Working Area Floor 23 to anchor Equipment Base Sled 12 while Thrust Cylinders 15 push Advancing Sleds 10 ahead a distance equal to the stroke length of Thrust Cylinders 15. Therefore, the frictional resistance to moving Equipment Base Sled 12 must be greater than the frictional resistance to moving individual units of Advancing Sleds 10. This condition is assured by designing individual Advancing Sleds 10 to weigh substantially less than Equipment Base Sled 12 and the equipment carried thereon.

The Self Advancing Mining Sled relies on friction between Advancing Sleds 10 and Working Area Floor 23 to anchor Advancing Sleds 10 while Thrust Cylinders 15 pull Equipment Base Sled 12 ahead a distance equal to the stroke length of Thrust Cylinders 15. Therefore, the frictional resistance to moving Advancing Sleds 10 must be greater than the frictional resistance to moving Equipment Base Sled 12. This condition is assured by designing the combined weight of Advancing Sleds 10 to be substantially more than the weight of Equipment Base Sled 12 and the equipment carried thereon.

Forward motion of Advancing Sleds 10 may cause loose material such as soil, sand, clay, vegetable matter or other debris to pack into the spaces between Advancing Sleds 10. FIG. 4 depicts an interlocking device to prevent excessive separation of Advancing Sleds 10. Interlocking Angles 21*a* and 21*b* are welded or bolted to the sides of Advancing Sleds 10 so that excessive lateral motion between Advancing Sleds 10 will cause the faces of Interlocking Angles 21*a* to butt against the faces of Interlocking Angles 21*b*. Equipping all Advancing Sleds 10 with Interlocking Angles 21*a* and 21*b* will allow all Advancing Sleds 10 to oppose excessive lateral movement of any individual Advancing Sled 10.

The length of the horizontal and vertical legs of Interlocking Angles 21*a* and 21*b* provide for flexibility between Advancing Sleds 10 so that vertical curves and horizontal curves in the working area may be traversed. Vertical curves will be necessary when the Self Advancing Mining Sled is traversing undulating terrain. Horizontal curves will be necessary when the Self Advancing Mining Sled must change direction or diverge from a straight line advance.

The advancing sequence of the Self Advancing Mining Sled is depicted in FIGS. 5*a* through 5*f*.

In FIG. 5*a*, all Advancing Sleds 10 are in the retracted position in response to Thrust Cylinders 15 being in the retracted position. The relative positions of Thrust Cylinders 15, Advancing Sleds 10, and Equipment Base Sled 12 are indicated in FIG. 5*a*.

In FIG. 5*b*, Advancing Sled 10*a* is thrust ahead a distance equal to Step Length 13 by supplying pressurized fluid to Thrust Cylinders 15*a* to cause them to move to the extended position. Because the weight of Advancing Sled 10*a* is much less than the weight of Equipment Base Sled 12 and the equipment carried thereon, the extension of Thrust Cylinders 15 causes Advancing Sled 10*a* to move into the forward position as depicted by FIG. 3*b*. FIG. 5*b* depicts the relative position of all Advancing Sleds 10 and Equipment Base Sled 12 at this point in the forward propulsion cycle.

Repetition of the preceding steps to pressurize Thrust Cylinders 15*b* to push Advancing Sled 10*b* ahead a distance equal to Step Length 13 will result in the equipment configuration shown on FIG. 5*c*. Similar repetitions to push ahead Advancing Sleds 10*c*, 10*d*, and 10*e* result in configurations depicted in FIGS. 5*d*, 5*e*, and 5*f* respectively.

Equipment Base Sled 12 is pulled forward a distance equal to Step Length 13 by simultaneously pressurizing all Thrust Cylinders 15 to cause them to retract to the retracted position. Because the combined weight of Advancing Sleds 10 is greater than the weight of Equipment Base Sled 12 and the equipment it is relocating, Advancing Sleds 10 remain stationary while Equipment Base Sled 12 slides over Working Area Floor 23. This part of the sequence completes the propulsion cycle and returns Equipment Base Sled 12, Advancing Sleds 10, and Thrust Cylinders 15 to the relative positions indicated by FIG. 5*a* The entire Self Advancing Mining Sled has been advanced a distance equal to Step Length 13.

DESCRIPTION AND OPERATION—ALTERNATIVE EMBODIMENT: SUPPLEMENTAL ANCHORS

Figure 6A:
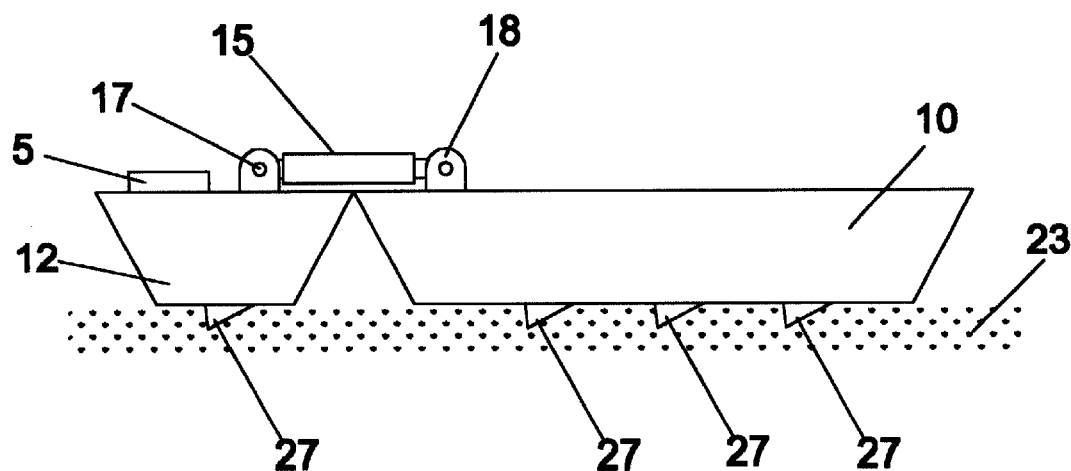
FIGS. 6a and 6b show a side view of saw tooth devices that may be used to provide supplemental anchoring to the Self Advancing Mining Sled.
Figure 6B:
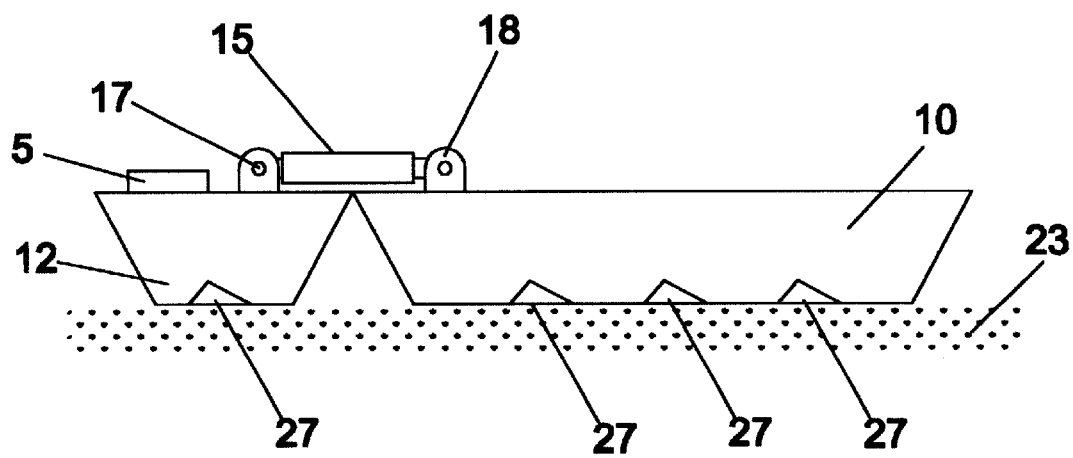

Certain conditions of Working Area Floor 23 may result in situations where the friction forces opposing movement of Advancing Sleds 10 or Equipment Base Sled 12 are inadequate This may occur, for instance, if the Working Area Floor 23 is inconsistent so that areas with low coefficients of friction are interspersed with areas of high coefficients of friction. This situation may cause Advancing Sleds 10 to slide backward while Thrust Cylinders 15 are trying to pull Equipment Base Sled 12 forward. Alternately, Equipment Base Sled 12 may slide backward while trying to push Advancing Sleds 10 ahead Multiple variations of supplemental anchoring devices may be used to increase the resisting friction between the Self Advancing Mining Sled and Working Area Floor 23. FIG. 6*a* shows Saw Teeth 27 attached to the bottom of Advancing Sleds 10 and to the bottom of Equipment Base Sled 12. The forward faces of Saw Teeth 27 are sloped to allow easy forward motion, but the rearward faces of Saw Teeth 27 are sloped to dig into Working Area Floor 23 and oppose backward motion. FIG. 6*b* shows a similar design with retracting Saw Teeth 27 that pivot about Tooth Pin 28. Springs, hydraulic or pneumatic bladders or cylinders, or gravity may be used to force Saw Teeth 27 down into Working Area Floor 23 to oppose rearward motion of Advancing Sleds 10 and Equipment Base Sled 12.

Figure 7A:
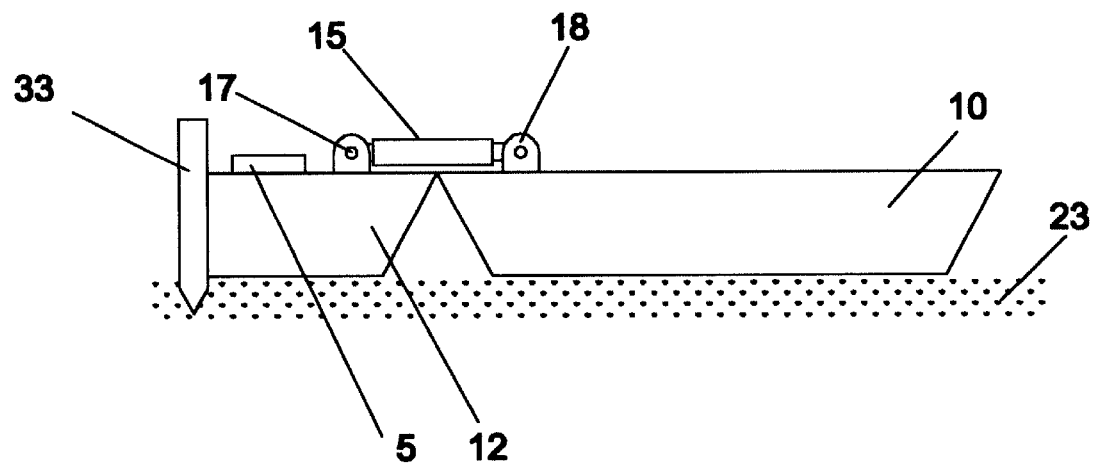
FIGS. 7a and 7b show a side view of a pinning device that may be used to provide supplemental anchoring to the Self Advancing Mining Sled.
Figure 7B:
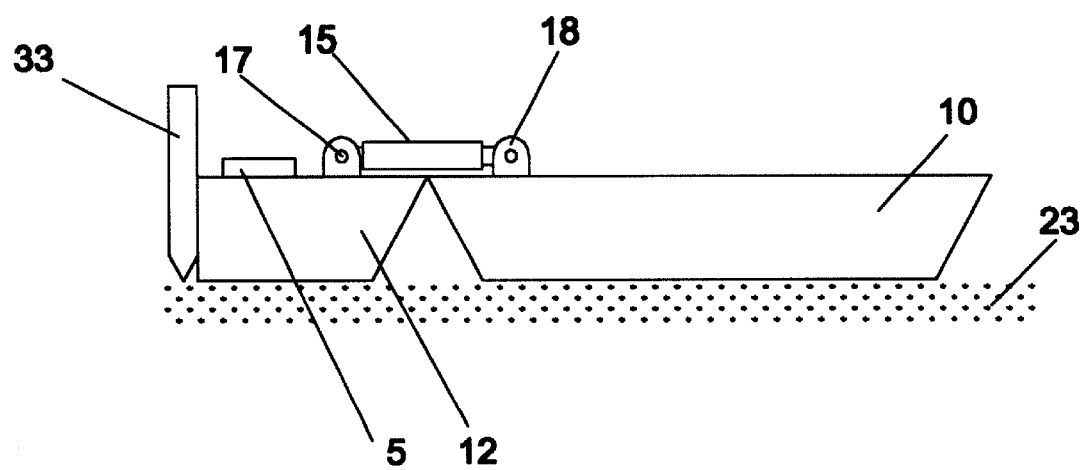

FIGS. 7*a* and 7*b* show Anchor Pin 33 that may be used to prevent backward motion of Advancing Sleds 10 and Equipment Base Sled 12. This supplemental anchoring system is well known in the dredging industry where floating barges are held stationary by similar anchor pins known as spuds. Anchor Pins 33 may penetrate Working Area Floor 23 by any combination of gravity, hydraulic or pneumatic jetting, vibration, auguring, or other means.

DESCRIPTION AND OPERATION—ALTERNATIVE EMBODIMENT: ADVANCE SYSTEM MOTIVE FORCE

The preferred embodiment of this invention is described with the use of Thrust Cylinders 15 to push Advancing Sleds 10 and to pull Equipment Base Sled 12. Alternately, any combination of cylinders, springs, ropes and pulleys, rack and pinion gears, or other such devices may be used to provide the motive forces to push Advancing Sleds 10 and to pull Equipment Base Sled 12.

DESCRIPTION AND OPERATION—ALTERNATIVE EMBODIMENT: STRUCTURAL SHAPES

The preferred embodiment of this invention is described with Advancing Sleds 10 and Equipment Base Sled 12 as rectangular box-like structures with upwardly sloping forward and rearward faces. Many variations of this basic shape may be utilized to fit the specific need of the application. The top surfaces of Advancing Sleds 10 and Equipment Base Sled 12 may be smooth, solid, slotted, riffled, open or any other configuration suitable to the installation. The bottom surfaces of Advancing Sleds 10 and Equipment Base Sled 12 may be solid, slotted, riffled, open or any other configuration suitable to the installation. Advancing Sleds 10 and Equipment Base Sled 12 may be simple plate-like structures without enclosing sides. Equipment Base Sled 12 may be made to slide into Advancing Sleds 10 or Advancing Sleds 10 may be made to slide into Equipment Base Sled 12.

The preferred embodiment of this invention is described with five Advancing Sleds 10 and one continuous Equipment Base Sled 12 Any other number of and combination of Advancing Sleds 10 and Equipment Base Sled 12 may be devised. Equipment Base Sled 12 may be constructed of multiple modules. Advancing Sleds 10 may be constructed as one continuous unit.

DESCRIPTION AND OPERATION— ALTERNATIVE EMBODIMENT: ELEVATION CONTROL DEVICE

Figure 8:
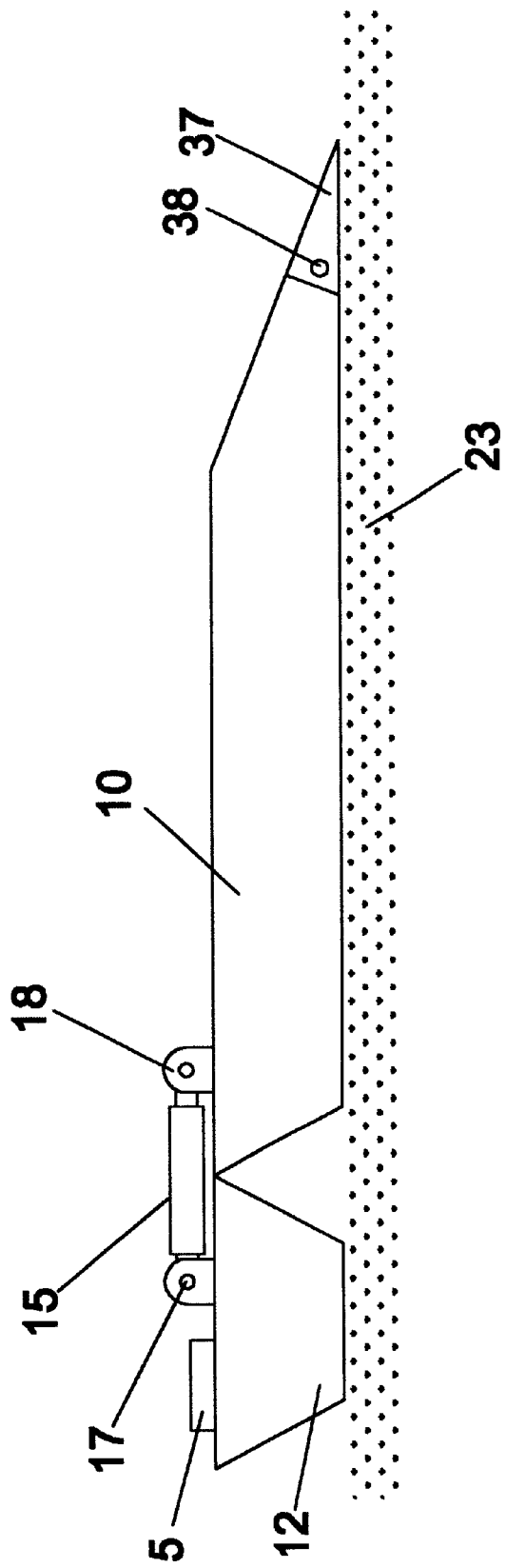
FIG. 8 shows a cross sectional view of a Self Advancing Mining Sled equipped with an elevation control device.

FIG. 8 shows a cross sectional view of a Self Advancing Mining Sled equipped with an elevation control device. The forward edge of Advancing Sled 10 is equipped with Elevation Control Wedge 37 that can be caused to pivot about Wedge Pin Connection 38. Raising the tip of Elevation Control Wedge 37 will cause the Self Advancing Mining Sled to climb on top of material on Working Area Floor 23 and will therefore cause the sled to gain elevation. Lowering the tip of Elevation Control Wedge 37 will cause the Self Advancing Mining Sled to dig under loose material on Working Area Floor 23 and will cause the sled to lose elevation. The position of Elevation Control Wedge 37 can be adjusted by Wedge Actuator 39 which may be springs, hydraulic or pneumatic bladders or cylinders. Many variations of this method of elevation control may be devised.

DESCRIPTION AND OPERATION— ALTERNATIVE EMBODIMENT: NARROW CONFIGURATION

Figure 9A:
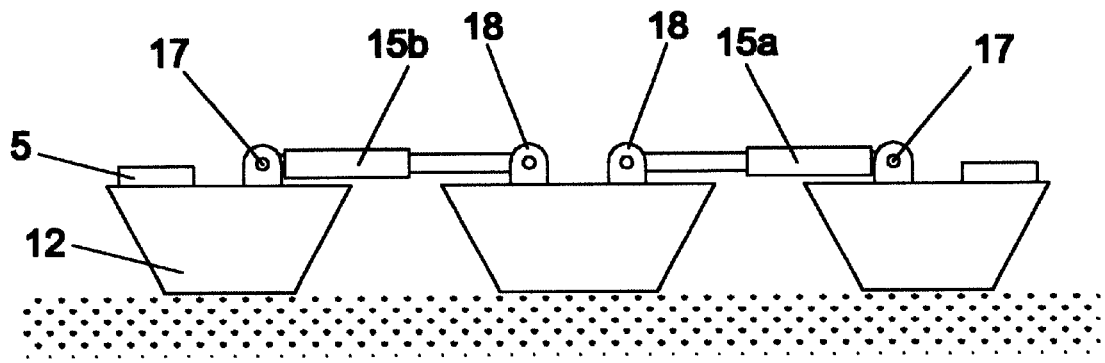
FIGS. 9a and 9b show cross sectional and plan views of a Self Advancing Mining Sled with three Advancing Sleds arranged in a line and advancing parallel to the axis of the line.
Figure 9B:
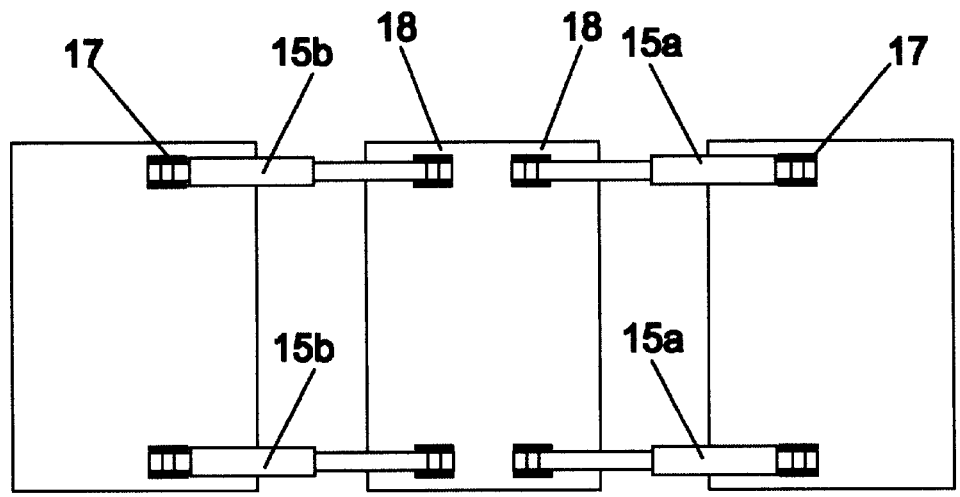

The preferred embodiment of this invention pertains to situations where the Self Advancing Mining Sled is advancing in a direction perpendicular to the long axis of the Self Advancing Mining Sled. The embodiment depicted in FIGS. 9a and 9b is developed for those cases where the Self Advancing Mining Sled is required to operate in narrow restricted areas, such as in tunnels or around buildings and other obstacles.

Advancing Sleds 10a through 10c are connected by Thrust Cylinders 15. The Self Advancing Mining Sled is advanced by sequential advance of each Advancing Sled 10 while using the other Advancing Sleds 10 as stationary anchors. Advancing Sled 10a, and any equipment carried thereon, is advanced by extending Thrust Cylinders 15a while using Advancing Sleds 10b and 10c as anchors. Advancing Sled 10b, and any equipment carried thereon, is advanced by extending Thrust Cylinders 15b and retracting Thrust Cylinders 15a while using Advancing Sleds 10a and 10c as anchors. Advancing Sleds 10c, and any equipment carried thereon, is advanced by retracting Thrust Cylinders 15b while using Advancing Sleds 10a and 10b as anchors Any number of Advancing Sleds 10 and equipment to be transported may be connected and advanced in this sequential manner.

DESCRIPTION AND OPERATIVE— ALTERNATIVE EMBODIMENT: WET MINING OPERATION

FIG. 10 provides a plan view of the Self Advancing Mining Sled used as a means to transport hydraulic mining and slurry pumping equipment. In this situation, high pressure Water Nozzles 50 are mounted on Equipment Base Sled 12 and are used to excavate and slurry material in a method well known to the mining industry. Advancing Sleds 10 are constructed as long wedges to slide under excavated material and to lift it up as Advancing Sleds 10 are pushed ahead. Continued advance of the Self Advancing Mining Sled will cause the excavated material to be pushed across Overlapping Deck 13 and onto Equipment Base Sled 12. Equipment Base Sled 12 is constructed as a trough to channel the mined material to the intake of Slurry Pump 52 for pumping to the disposal area or processing plant. Swivel Joints 55 are provided in Slurry Discharge Pipe 57 and Water Intake Pipe 59 to allow advance of the Self Advancing Mining Sled. Wing Walls 60 are provided on Advancing Sleds 10 positioned at the end of the Self Advancing Mining Sled to seal the pool of slurry water in front of the mining operation.

DESCRIPTION AND OPERATION— ALTERNATIVE EMBODIMENT: DRY MINING OPERATION

Figure 11:
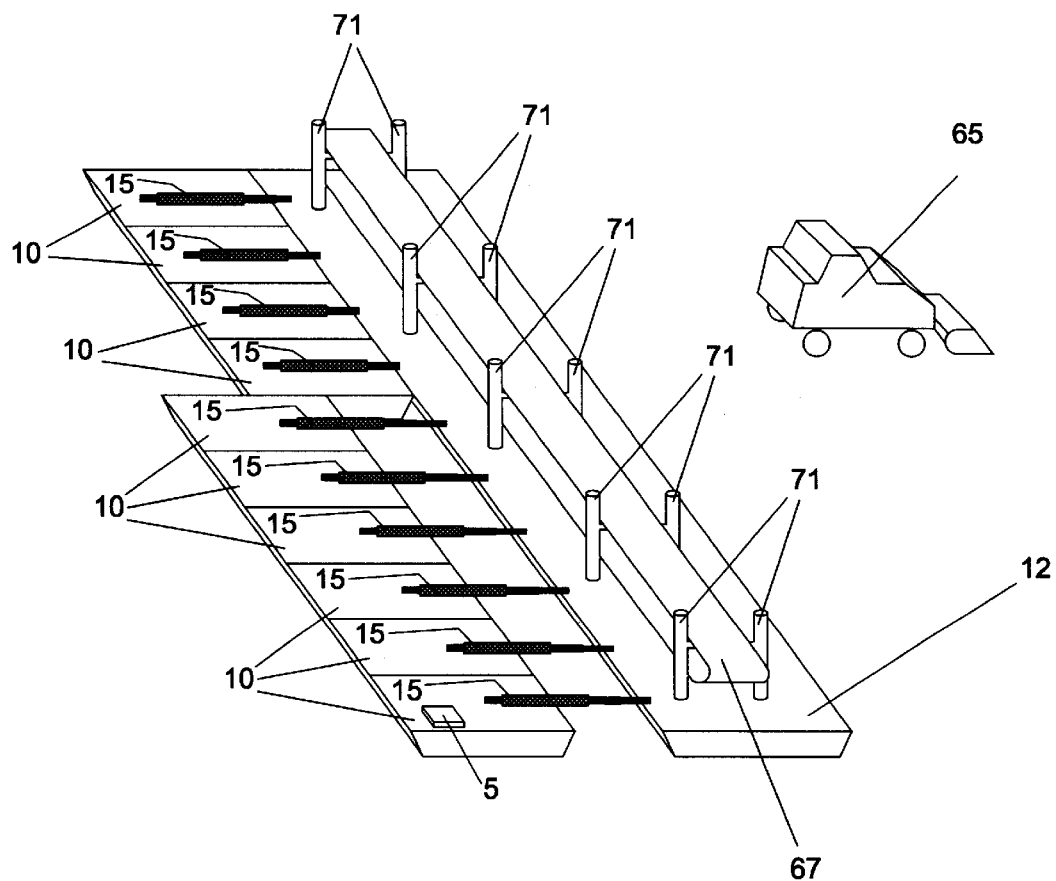
FIG. 11 shows an isometric view of a Self Advancing Mining Sled depicted as a means to relocate conveyor systems used in dry mining systems.

FIG. 11 provides an isometric view of the Self Advancing Mining Sled used as a means to transport dry mining material transport systems. In this situation, an Excavator 65 such as a dragline, shovel, backhoe, loader, bucket wheel excavator, continuous miner or other excavators well known to the mining industry is used to excavate material and discharge it onto Conveyor 67 which is mounted on Equipment Base Sled 12. In the case of conventional conveyor belt systems, it will be necessary to provide computerized Control Means 5 controlling Vertical Level Adjusters 71 and Thrust Cylinders 15 to keep Conveyor 67 straight and level for continuous operation. Alternately, Conveyor 67 may be a continuous chain type as used in longwall mining.

CONCLUSION, RAMIFICATIONS, AND SCOPE OF INVENTION

Thus, the described invention provides a reliable, economical, and self-contained means to transport heavy equipment units across all types of surfaces that may vary from very hard to very soft conditions. The described equipment has provision to achieve vertical curves to fit undulating surfaces and has provision to achieve horizontal curves for steering the Self Advancing Mining Sled. The described invention provides a method to use such equipment to relocate heavy equipment across such soft surfaces. Furthermore, the invention describes use of such equipment in dry mining and wet mining applications.

While the description above provides many specifics, these should not be construed as limitations on the scope of the invention, but rather as exemplification of one embodiment and the described alternative embodiments. Many other variations are also possible. For instance, a rope or cable may be used to place a compressive force on Advancing Sleds 10 to oppose lateral separation. Thrust Cylinders 15 may be placed anywhere on Advancing Sleds 10 or Equipment Base Sled 12. The Self Advancing Mining Sled may be comprised only of Advancing Sleds 10 and may be made to advance either perpendicular or parallel to the long axis of the Self Advancing Mining Sled. Advancing Sleds 10 may be made in a tapered shape so that the forward face is wider than the rearward face. Such shape will provide "self cleaning" between adjacent Advancing Sleds 10.

Accordingly, the scope of the invention should be determined not by the embodiments illustrated, but by the appended claims and their legal equivalents.

I claim:

1. A device for relocating machinery across a working surface comprising:
    A. three or more sleds;
    B. linearly-acting positioning means consisting of at least one double acting fluid cylinder acting between said sleds for respective movement; and,
    C. control means to cause said positioning means to sequentially slide individual units of said sleds while using remaining units of said sleds as frictional anchors.

2. A device for relocating machinery as recited in claim 1 wherein:

A. said sleds are arranged in a linear string; and,

B. said positioning means is provided to advance said device for relocating machinery in a direction substantially parallel to the axis of said linear string.

3. A device for relocating machinery as recited in claim 1 wherein:

A. said sleds are arranged in a linear string; and,

B. said positioning means is provided to advance said device for relocating machinery in a direction substantially perpendicular to the axis of said linear string.

4. A method of relocating machinery across a working surface comprising:

A. joining together three or more sleds provided with linear-acting positioning means for sliding said sleds with respect to each other;

B. supporting said machinery on said sleds;

C. sliding one of said sleds in the desired advance direction with said positioning means while using the remaining sleds as anchors;

D. repeating said sliding of claim 4C for each of the remaining said sleds unit each sled has been moved in said desired advance direction; and, E. repeating said sliding of claim 4C and claim 4D until said machinery has been moved the desired amount.

5. The method of relocating machinery of claim 4 in which multiple units of said sleds are moved simultaneously.

* * * * *